United States Patent [19]

Takahashi

[11] Patent Number: 5,602,837

[45] Date of Patent: Feb. 11, 1997

[54] MULTIPLEX SYSTEM FOR A PERSONAL HANDY PHONE SYSTEM

[75] Inventor: Hideaki Takahashi, Tokyo, Japan

[73] Assignee: NEC Corporation, Tokyo, Japan

[21] Appl. No.: 629,273

[22] Filed: Apr. 8, 1996

Related U.S. Application Data

[63] Continuation of Ser. No. 355,023, Dec. 13, 1994, abandoned.

[30] Foreign Application Priority Data

Dec. 28, 1993 [JP] Japan .................................... 5-336194

[51] Int. Cl.$^6$ ................................ H04B 7/26; H04J 3/12
[52] U.S. Cl. .......................... 370/280; 375/240; 379/63; 455/54.1; 370/385; 370/435; 370/524; 395/2.91
[58] Field of Search ................................ 370/24, 29, 56, 370/58.1, 58.2, 58.3, 60, 60.1, 68.1, 79, 81, 84, 94.1, 94.2, 95.1, 110.1, 112, 118; 375/240; 379/58, 59, 63, 88, 93, 94; 381/29; 455/33.1, 34.1, 34.2, 53.1, 54.1, 56.1

[56] References Cited

U.S. PATENT DOCUMENTS

| | | | |
|---|---|---|---|
| 4,922,490 | 5/1990 | Blakley | 370/110.1 |
| 4,970,723 | 11/1990 | Lin | 370/110.1 |
| 5,159,594 | 10/1992 | Bales et al. | 370/110.1 |
| 5,228,026 | 7/1993 | Albrow et al. | 370/29 |
| 5,267,245 | 11/1993 | Maruyama et al. | 379/94 |
| 5,325,419 | 6/1994 | Connolly et al. | 379/59 |
| 5,436,889 | 7/1995 | Matsumoto et al. | 370/58.2 |

FOREIGN PATENT DOCUMENTS 63-215132  9/1988  Japan .

*Primary Examiner*—Alpus H. Hsu
*Attorney, Agent, or Firm*—Sughrue, Mion, Zinn, Macpeak & Seas

[57] ABSTRACT

Disclosed is a personal handy phone system subjected to improvements over the prior art system by disposing an ADPCM/PCM converter necessarily required in a base station on an exchange side, notifying error information utilizing each slot, performing interpolation processing on the exchange side. The B channel having a transmission rate of 64 kbps of ISDN is divided into the first half of 32 kbps and the latter half of 32 kbps. The voice data of 32 kbps ADPCM prepared on a radio section of the system is multiplexed on either half of the B channel divided into two halves and the system information is multiplexed on the remaining half of the channel. Processing procedures by means of an ordinary D channel can thereby be carried out as it is, independent of the PHS condition on the line exchange of ISDN and without touching entirely on a network.

3 Claims, 5 Drawing Sheets

MULTIPLEX SYSTEM FOR A PERSONAL HANDY PHONE SYSTEM

This is a Continuation of application Ser. No. 08/355,023 filed Dec. 13, 1994, now abandoned.

BACKGROUND OF THE INVENTION

1. Field of the Invention

The present invention relates to a personal handy phone system (PHS), and more particularly to linkage with a public telephone line.

2. Description of the Related Arts

In general, the PHS includes, as radio channel, four time slots each of which is constituted as 32 kbps ADPCM channel. As illustrated in FIG. 1, when the data sent from an external transmitter through the air is received by a transmitter/receiver 51 of TDMA/TDD system, and if the PHS channel is linked to two B channels and one D channel on an ISDN subscriber interface, the received data is separated on a time slot-by-time slot basis, taken out as received data for four channels such as B'1, B'2, B'3 and B'4, and inputted into 32 kbps data receiving registers (rr) 521~524. The outputs of the registers 521~524 are converted to 64 kbps μ-law PCM data B1~B4 by first converters (1st t) 541~544 each of which operates to convert 32 kbps ADPCM data into 64 kbps μ-law PCM data, and sent to 64 kbps data transmission registers (tr) 561~564. The tranmission registers 561~564 separate the respective inputs thereto into two sets of data (a set of B1 and B2; B3 and B4, for example) for connection to two B channels and one D channel, and transmit them to S interfaces 581 and 582, and the data are exchanged to respective ISDN subscriber lines.

On the other hand, the data sent from wired telephones are provided through the S interfaces 581 and 582 to second converters (2nd t) 551~554 each of which operates to convert 64 kbps μ-law PCM data into 32 kbps ADPCM data. The outputs of the second converters 551~554 are supplied through transmission registers 531~534 to the transmitter/receiver 51, and then transmitted into the air.

The B channel of ISDN subscriber interface has a transmission capability of 64 kbps. On the contrary, in the conventional technology wherein data has to be converted once into 64 kbps data in order to link the PHS data having a transmission speed of 32 kbps to the B channel of ISDN, the B channel has not been effectively utilized.

In addition, since there must be disposed the first and second converters for every four time slot within a base station, a large scale of circuit will be required for the system. Consequently, the whole facilities in the base station naturally become bulky.

According to the transmission control procedure in PHS now in effect, when data error occurs in a radio channel, one burst data including error data portion is to be discarded without performing error correction. However, in the case of ADPCM demodulation of voice data for PHS, only the differential data from the past data is concerned with the demodulation thereof. Thus, in the event that the received data disappears as the result of discarding of one burst data due to data error, it usually becomes impossible for the first converter to reproduce the voice data even when it thereafter receives normal data. To avoid this disadvantage, it is customarily practiced that the missing portion is generally filled with dummy data to interpolate the received data. What's more, since most of users desire to have more natural speech, highly sophisticated interpolation processing may often be utilized so as not to provide the users with unharmonious feeling. However, to carry out high grade interpolation processing, not only a scale of circuit and an external configuration or frame size, but also consumption current or current flow in a battery provided as power source become large, thus causing a cumbersome problem to be introduced in the design thereof. In the case of the prior art PHS, judgment as to whether or not the error of data has occured could be made only at the base station, so that the interpolation processing regarding the received data had to be made within the base station because no means for sending to ISDN exchange the information with regard to the occurence of troubles is provided.

As the sophistication of the base station grows more and more, the whole frame will also become bulk and heavy. An increase in the size of the whole frame prevents easy installation of the base station and give rise to problems in safety and the PHS which is to be constructed by use of microcells in the near future, and a business party must bear an increase in cost accompanied thereby.

As a specific system capable of effectively utilizing the B channel of ISDN, a time-shared exchange for multiplexing a plurality of low speed data channels and one signal channel is proposed in a paper, entitled "Investigation on 8×N kb/s multiple call linking system in ISDN exchange", The Institute of Electronics and Communication Engineers, Information Networks IN85-5. As described in the paper, effective utilization of the B channel for a plurality of low speed traffic calls can be accomplished by time sharing one data channel at a constant ratio for multiplexing. By way of example, there is Japanese Patent Laid-Open No. 215132/88, entitled "Multi-processing system for slow packet call". In this patent, an additional device is disposed which is linked to the time-shared exchange via an information channel and a call control signal line, and the division of packet corresponding to subchannels is carried out in the additional device.

Although a mere multiplexing may be accomplished by applying the prior art PHS to the above mentioned multuplex system as it is, it will be evident that various problems inherent to the prior art PHS may not be solved.

SUMMARY OF THE INVENTION

It is therefore an object of the present invention to provide a PHS wherein the B channel of ISDN can be effectively utilized.

Another object of the present invention to provide an improved PHS that are simplified by installing an ADPCM/PCM conversion heretofore necessarily used within the base station on the PHS exchange side and constructing an circuit arrangement in such that interpolation processing can be made on the PHS exchange side without excluding an error data occurred in each time slot.

The multiplex system for a personal handy phone system according to the present invention provides a PHS for connection to the B channel having a transmission rate of 64 kbps of ISDN and comprised of a portable telephone terminal, a base station and an exchange, to be characterised by further comprising means for dividing the B channel into the first half of 32 kbps and the latter half of 32 kbps, multiplexing the voice data of 32 kbps ADPCM prepared by a radio channel of the PHS on either half of the B channel divided into two halves, and also multiplexing the information about the system on the remaining half thereof.

The PHS base station includes a separator for separating the B channel into voice data and system information of 32 kbps ADPCM in responce to a call from ISDN, and a multiplexer for performing the multiplexing of voice data and system information of 32 kbps ADPCM in responce to a call from the portable telephone terminal.

The PHS exchange includes a separator for separating the B channel multiplex data from the base station into voice data and system information of 32 kbps ADPCM, a 32 kbps ADPCM voice data interpolation processor, a first converter for converting 32 kbps ADPCM data into 64 kbps μ-law PCM data in responce to the call from the portable telephone terminal upon the speaking between the portable telephone terminal and the public phone network terminal, a PCM data interpolation processor, a second converter for converting 64 kbps μ-law PCM data into 32 kbps ADPCM data in responce to the call from the public phone network terminal, and a multiplexer for performing the multiplexing of the voice data and the system information of the second converter.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENT

Figure 1:
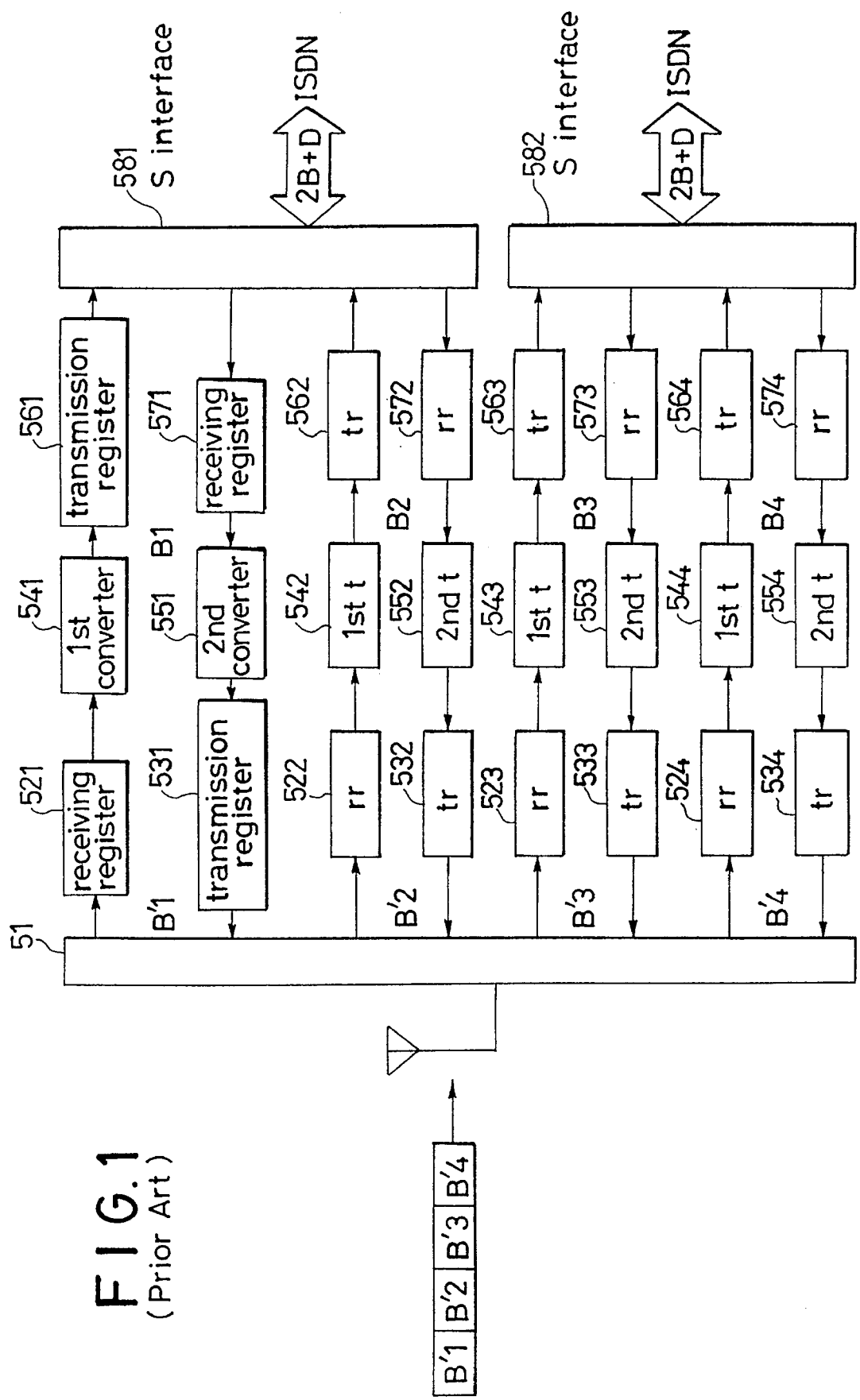
FIG. 1 is a block diagram of an ISDN interface for use in the prior art PHS.
Figure 2:
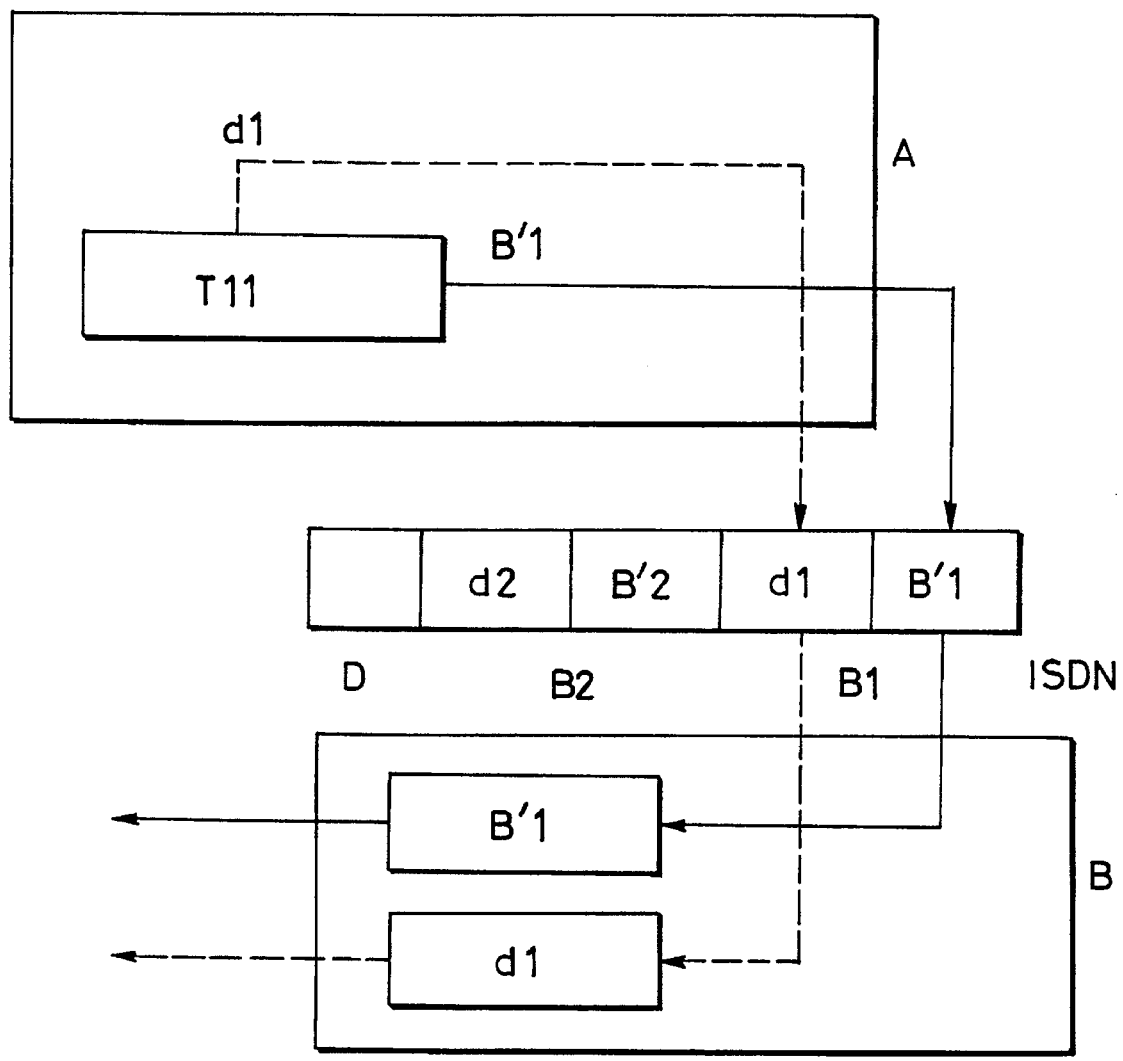
FIG. 2 shows a principle diagram useful for explaining the present invention.

Referring now to FIG. 2 illustrating a principle diagram useful for explaining the present invention, there is shown a system wherein data and system information on the PHS of 32 kbps ADPCM are multiplexed and separated. In a station (A in FIG. 2) A, B'1 shows voice data from a calling party T 11 or the data other than the voice. The data B'1 and the system information d 1 on the PHS are multiplexed on one B channel (B1 in FIG. 2) as one pair and thereafter transmitted. In a station B (B in FIG. 2), the multiplex data received is separated into the data B'1 and the system information d 1.

Figure 3:
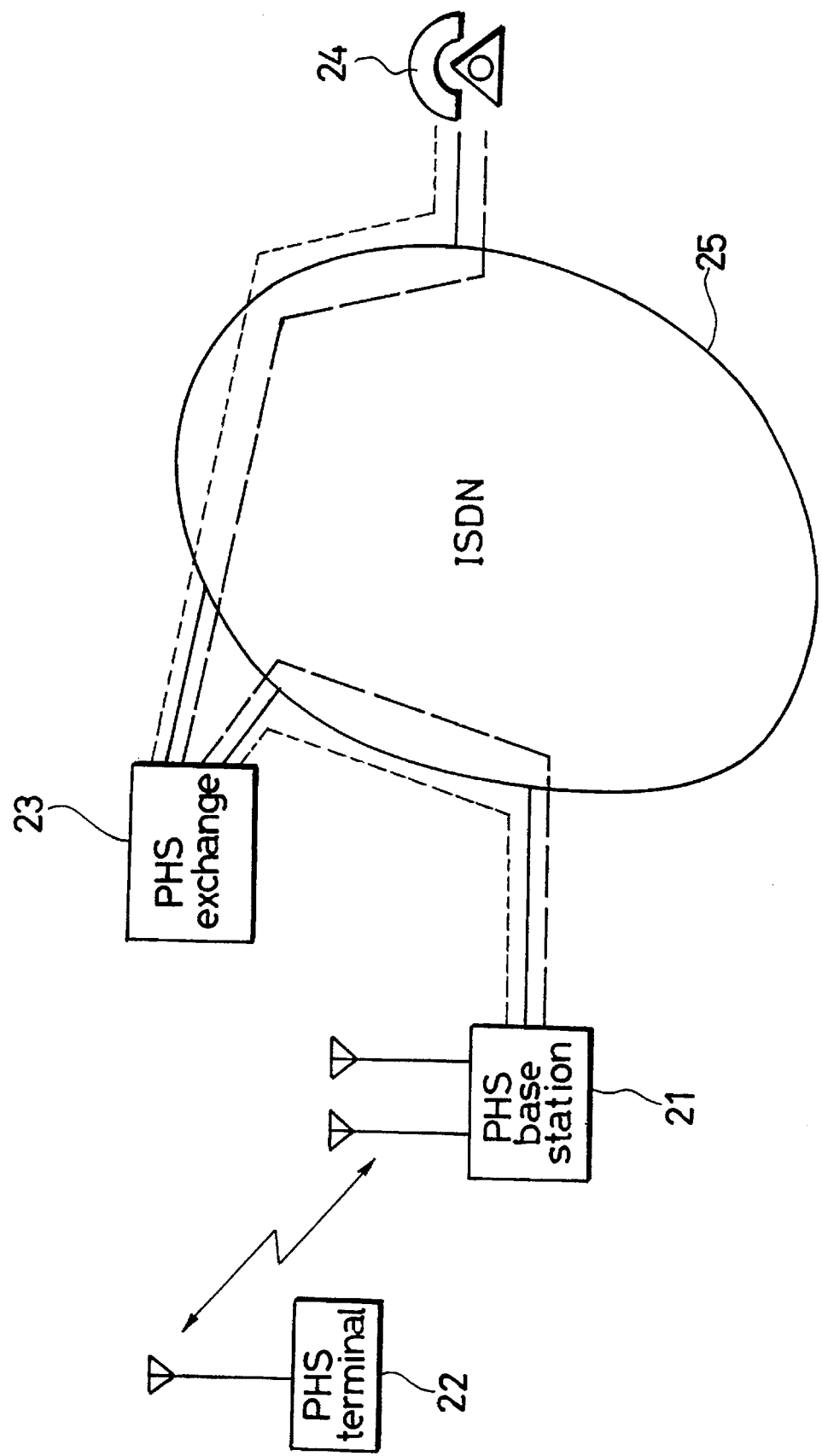
FIG. 3 is a constitutional diagram of a PHS network in accordance with one embodiment of the present invention.

As clearly seen from the constitutional diagram of FIG. 3 which shows a PHS network utilizing the multiplex system of the present invention, a base station 21 has a radio communication function with a PHS terminal 22 as well as a wire communication function with ISDN 25. In addition, a PHS exchange 23 has a function of linking a call from the base station 21 to a public phone network terminal 24 or other PHS base stations (not shown), or a function of linking a call from the public phone network terminal 24 or other base stations (not shown) to the base station 21.

The operation of the PHS network will herein be explained in detail. Assuming now that the PHS base station 21 is called out with the call from the PHS terminal 22, the base station 21 calls the PHS exchage 23 in a higher hierarchy. The data transmitted from the PHS terminal 22 is converted into a formal ISDN transmission format at the exchange 23 and linked to the public network. Since the data transmitted between the PHS base station 21 and the exchange 23 is the multiplexed data of 64 kbps, the connection of both in ISDN is possible. In addition, the multiplexed data of 64 kbps for circuit switching of ISDN will be linked via any route between the base station 21 and the exchange 23 according to ordinary call connection procedures without any limitations due to the PHS network. The exchange 23 does not establish communication between the PHS terminal 22 and the public phone line network terminal 24 until it links the public phone line network terminal 24 to the base station 21. The flow of data from the base station 21 to the public phone line network terminal 24 is indicated by a dotted line in FIG. 3.

On the contrary, when the public phone line network terminal 24 transmits a call, the exchange 23 is first called out as before. Then, the exchange 23 sends out a call to base stations located within the area that is under control of itself to call out the PHS terminal 22. The flow of data from the public phone line network terminal 24 to the base station 21 is indicated by a dashed line.

Figure 4:
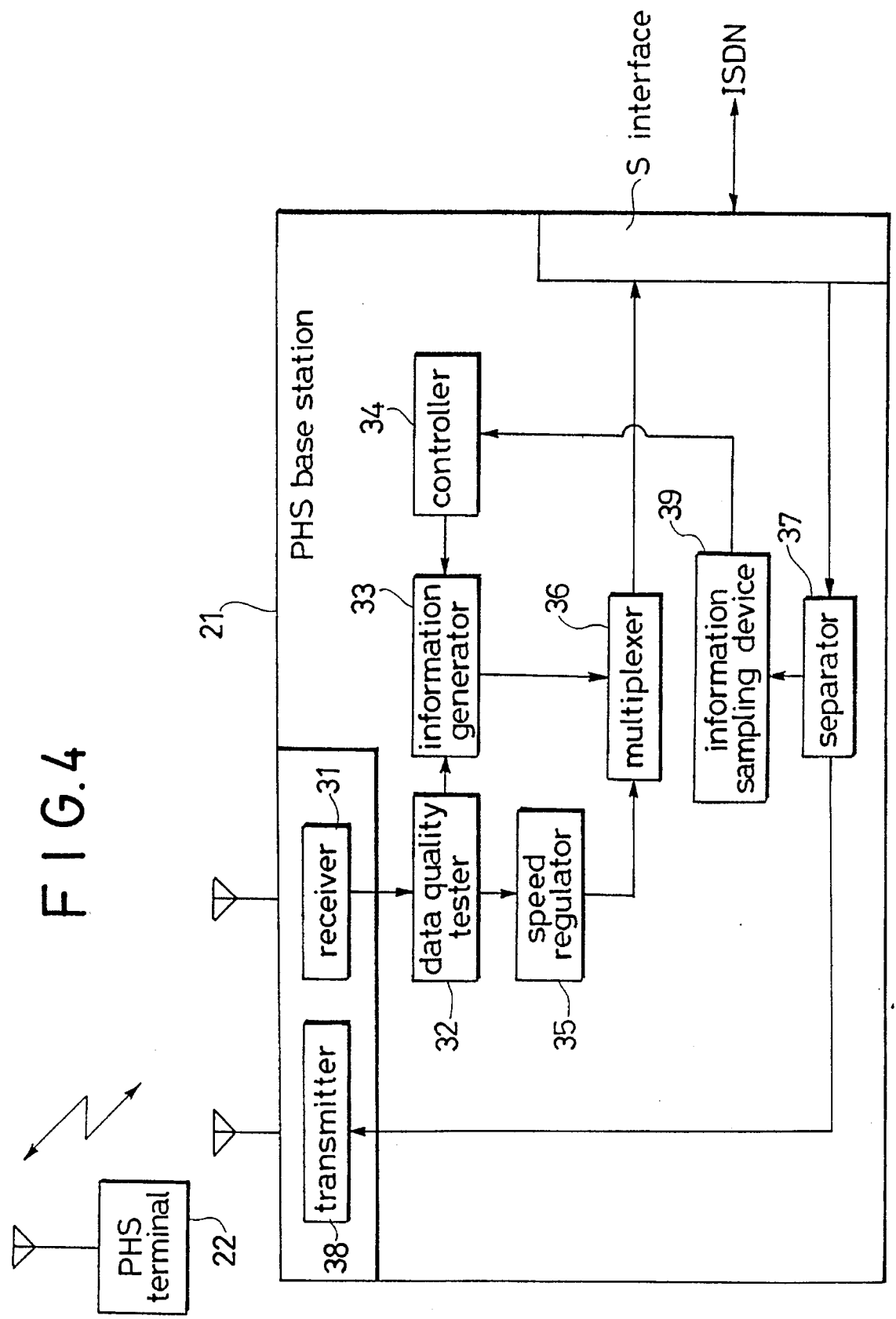
FIG. 4 is a constitutional diagram of a base station according to the present invention.

Herein, the operation of the base station 21 will be explained in detail by referring to FIG. 4.

When the data from the PHS terminal 22 is received by a receiver 31, the quality of data is appreciated at a data quality tester 32. In this specific embodiment, not only the presence or absence of unique word error and CRC error, but also the effectiveness of voice data will be judged. Information on the occurrence of error will be provided to an information generator 33 which prepares an error flag based on the results of the previous judgement. Besides, the information generator 33 generates traffic information, position entry information, health information on the base station or the like as PHS system information, according to commands from a base station controller 34. On the other hand, the data from the PHS terminal 22 is storaged once in the speed regulator 35 independent of the presence or absence of error and then called out sequentially at a rate of 64 kbps. At this moment, an idle space for 32 kbps comes out in the channel B. This idle space is filled with the system information generated by the information generator 33 through the multiplexing operation by a multiplexer 36. The information generated by the information generator 33 involves information on the data and information on the whole system of 32 kbps, both of which are to be simultaneously multiplexed.

When the base station 21 receives the call from ISDN, the data from ISDN is separated into the system information on the PHS and the data of voice or the like at the separator 37. Then, the voice data or the like is supplied to a transmitter 38, and the system information is supplied to the base station controller 34 via an information sampling device 39.

Figure 5:
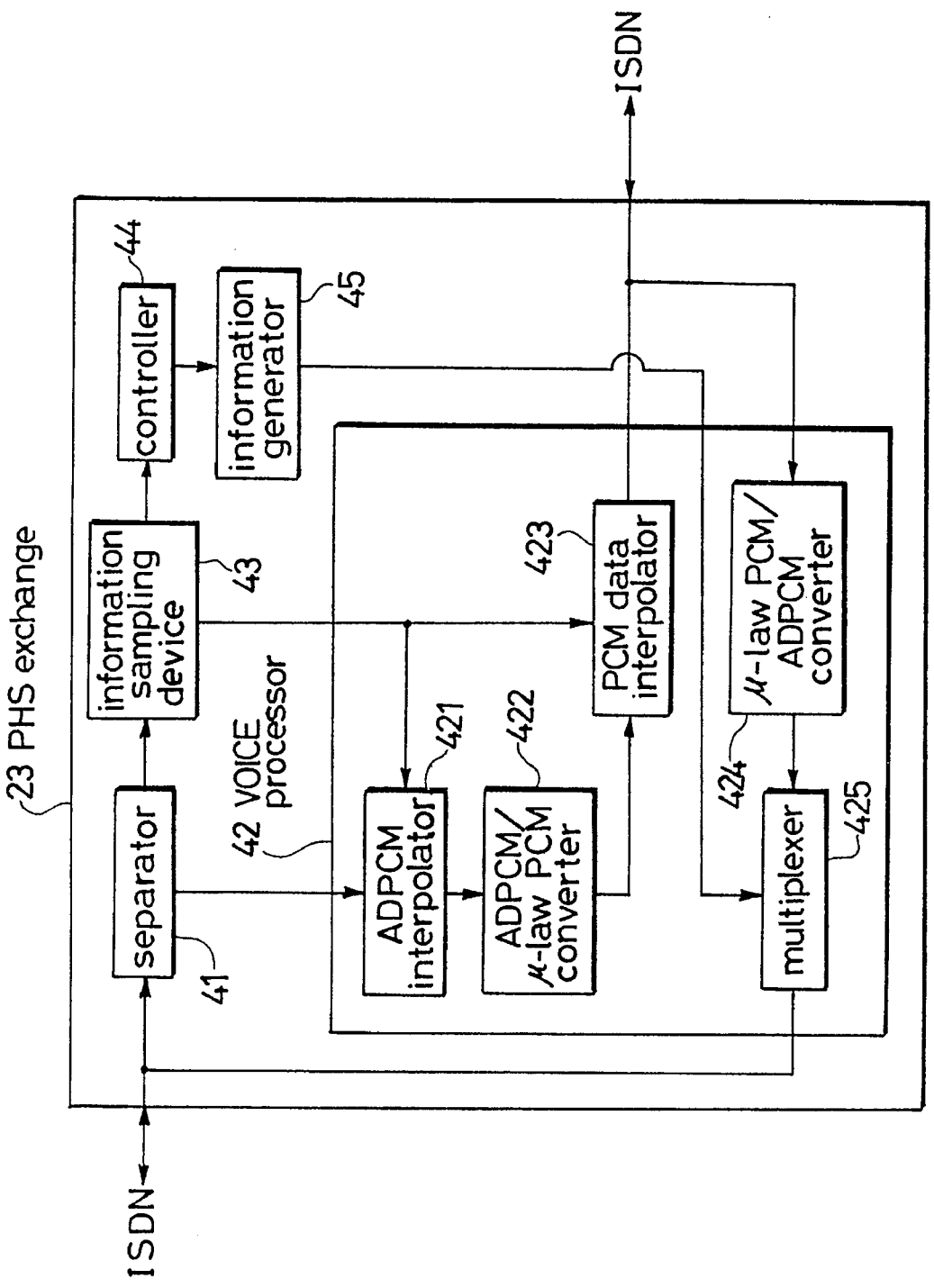
FIG. 5 is a constitutional diagram of an exchange according to the present invention.

The operation of the PHS exchange 23 will herein be explained in detail by referring to FIG. 5.

When the PHS exchange 23 receives the call from the PHS terminal 22 by way of ISDN, a separator 41 separates the received data into the system information on the PHS and the data of voice or the like, and supplies the data of voice or the like to a voice processor 42 and supplies the system information to an information sampling device 43. The information sampling device 43 first checks to see if the error flag is established and notifies the results of checking to the voice processor 42. A converter 422 functions to convert 32 kbps ADPCM data into 64 kbps μ-law PCM data when the exchange 23 receives the call from the PHS terminal 22. Interpolation processing of the voice data is carried out by an ADPCM voice interpolator 421 and a PCM data interpolator 423 when the voice processor 42 receives the error flag from the information sampling device 43. When no error flag is detected, the voice processor 42 converts the received data into the PCM data as it is and supplies the data to ISDN.

The information sampling device 43 supplies the system information to an exchange controller 44 for subsequent use.

A converter 424 functions to convert 64 kbps μ-law PCM data into 32 kbps ADPCM data when the PHS exchange 23 receives the call from the public phone network, and the output of which is multiplexed together with the system information by a multiplexer 425, and then transmitted to the base station via ISDN.

As heretofore explained, it will be clearly understood that the ISDN line is effectively utilized by multiplexing the system information and the voice or other data of 32 kbps on the B channel line of 64 kbps.

In addition, the ADPCM-to-PCM converter and the PCM-to-ADPCM converter become unnecessary in the base station. And, since the information on data quality is also multiplexed concurrently, the voice interpolation processing function that had been necessarily used in the prior art base station becomes unnecessary, thus making possible the alleviation of hardware and software function in the base station, and accomplishing the miniaturization of the whole facilities in the base station.

As the processing of voice or the like is carried out on the exchange side, a high degree of interpolation procedures can be performed. Also, because the information on traffic and health check within the base station are multiplexed together, a high degree of service becomes possible.

Fundamentally, as stated above, since 64 kbps data is used in the channel B of ISDN, a modification over usual call linking procedures, or especially, the method of utilization of the D channel is not needed at all. For this reason, it may be said that the present invention provides a system having high affinity with ISDN.

In particular, even for business parties possessing no their own wire lines, there are merits of being able to participate in the PHS business at a relatively lower cost by merely taking a lease of the existing ISDN and preparing a base station and an exchange.

Although certain preferred embodiments of the present invention have been shown and described in detail, it should be understood that various changes and modifications may be made therein without departing from the scope of the appended claims.

What is claimed is:

1. A personal handy phone system comprising:
a portable phone terminal transmitting outgoing ADPCM voice data;
a base station for receiving said outgoing ADPCM voice data of said portable phone terminal; and
an exchange communicatively linking said base station to a public phone network terminal via an ISDN,
wherein said base station comprises:
an information generator for generating system data; and
means for multiplexing said system data and said outgoing ADPCM voice data to form outgoing multiplexed data in a B channel of said ISDN, and
wherein said exchange comprises:
an ADPCM voice dam interpolator for interpolating said outgoing ADPCM voice data;
a first converter for converting said ADPCM outgoing ADPCM voice data into outgoing PCM voice data;
a PCM data interpolator for interpolating said PCM outgoing voice data; and
a second converter for converting incoming PCM voice data into incoming ADPCM voice data in response to a call from said public network terminal.

2. A personal handy phone system as set forth in claim 1, wherein said base station further comprises:
a separator for receiving a call from said exchange via said ISDN, and separating incoming multiplexed data in the B channel of said ISDN into incoming ADPCM voice data and incoming system data, wherein
said multiplexing means comprises a multiplexer for multiplexing said outgoing ADPCM voice data and said system data in response to a call from said phone terminal.

3. A personal handy phone system comprising:
a portable phone terminal transmitting outgoina ADPCM voice data;
a base station for receiving said outgoing ADPCM voice data of said portable phone terminal;
an exchange communicatively linking said base station to a public phone network terminal via an ISDN,
wherein said base station comprises:
an informational generator for generating system data;
means for multiplexing said system data and said outgoing ADPCM voice data to form outgoing multiplexed data in a B channel of said ISDN, and wherein
said exchange comprises:
a separator for receiving said outgoing multiplexed data from said base station via said B channel of said ISDN, and separating said outgoing multiplexed data from said base station into said outgoing ADPCM voice data and said system data;
an ADPCM voice data interpolator coupled to an output of said separator for interpolating said outgoing ADPCM voice data;
a first converter coupled to an output of said ADPCM voice data interpolator for converting said ADPCM outgoing ADPCM voice data into outgoing PCM voice data;
a PCM data interpolator coupled to an output of said first converter for interpolating said PCM outgoing voice data;
a second converter for converting incoming PCM voice data into incoming ADPCM voice data in response to a call from said public network terminal;
a second informational generator for generating second system data; and
a multiplexer coupled to respective outputs of said second converter and said second informational generator for multiplexing said incoming ADPCM voice data and said second system data.

* * * * *